United States Patent
Vickers

(10) Patent No.: US 10,273,011 B2
(45) Date of Patent: *Apr. 30, 2019

(54) AIRCRAFT ENVIRONMENTAL CONTROL SYSTEM

(71) Applicant: BAE Systems plc, London (GB)

(72) Inventor: Mark Gordon Vickers, Yorkshire (GB)

(73) Assignee: BAE Systems plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/770,960

(22) PCT Filed: Nov. 3, 2016

(86) PCT No.: PCT/GB2016/053412
§ 371 (c)(1),
(2) Date: Apr. 25, 2018

(87) PCT Pub. No.: WO2017/077301
PCT Pub. Date: May 11, 2017

(65) Prior Publication Data
US 2018/0305029 A1 Oct. 25, 2018

(30) Foreign Application Priority Data

Nov. 6, 2015 (EP) ................................. 15275229
Nov. 6, 2015 (GB) ................................. 1519607.4

(51) Int. Cl.
*B64D 13/08* (2006.01)
*B64D 13/06* (2006.01)
*G05D 23/19* (2006.01)

(52) U.S. Cl.
CPC ............. *B64D 13/08* (2013.01); *B64D 13/06* (2013.01); *G05D 23/1917* (2013.01); *G05D 23/1919* (2013.01); *B64D 2013/0618* (2013.01)

(58) Field of Classification Search
CPC ................. B64D 13/08; B64D 13/06; B64D 2013/0618; G05D 23/19; G05D 23/1917
(Continued)

(56) References Cited

U.S. PATENT DOCUMENTS 2,945,186 A 7/1960 Barash
3,196,255 A 7/1965 Beauchamp et al.
(Continued)

FOREIGN PATENT DOCUMENTS

CN 203528824 U 4/2014
EP 2827507 A2 1/2015
(Continued)

OTHER PUBLICATIONS

International Search Report & Written Opinion for Appl PCT/GB2016/053412 dated Jan. 25, 2017, 11 pages.
(Continued)

*Primary Examiner* — Marthe Y Marc-Coleman
(74) *Attorney, Agent, or Firm* — Maine Cernota & Rardin

(57) ABSTRACT

An aircraft environmental control system (4) for controlling a temperature of a fluid, the control system (4) comprising: a temperature sensor (30) configured to measure a temperature of the fluid and to generate a first signal, the first signal being indicative of the measured temperature; a control signal generator (52) configured to, dependent upon the first signal, generate a control signal for controlling the temperature of the fluid; and one or more processors (64) configured to, responsive to determining that the measured temperature is less than or equal to a pre-determined threshold value (e.g. 0° C.), increase a gain of the control signal generator (52).

14 Claims, 7 Drawing Sheets

(58) Field of Classification Search
USPC .......................................................... 701/36
See application file for complete search history.

(56) References Cited

U.S. PATENT DOCUMENTS

| | | | |
|---|---|---|---|
| 3,699,777 A | 10/1972 | Rannenberg | |
| 4,673,031 A | 6/1987 | Wiemer | |
| 4,978,064 A * | 12/1990 | Steiner .................... | B60H 1/16 237/12.3 A |
| 5,095,453 A | 3/1992 | Person et al. | |
| 5,539,672 A * | 7/1996 | Mullin .................... | F23N 5/102 331/117 FE |
| 6,012,515 A | 1/2000 | Stubbendorff | |
| 2001/0007337 A1 | 7/2001 | Buchholz | |
| 2006/0105049 A1 | 5/2006 | Fernandes et al. | |
| 2015/0176501 A1 | 6/2015 | MacKin | |
| 2017/0052836 A1 | 2/2017 | Horabin | |

FOREIGN PATENT DOCUMENTS

| | | | |
|---|---|---|---|
| EP | 2851295 A1 | 3/2015 | |
| EP | 2939926 A1 | 4/2015 | |
| GB | 2517174 A | 2/2015 | |
| WO | 2005063575 A1 | 7/2005 | |
| WO | 2006105049 A2 | 10/2006 | |
| WO | 2015124891 A1 | 8/2015 | |

OTHER PUBLICATIONS

International Search Report & Written Opinion for Appl PCT/GB2016/053416 dated Jan. 16, 2017, 117 pages.
International Search Report & Written Opinion for Appl PCT/GB2016/053419 dated Nov. 28, 2016, 12 pages.
International Search Report & Written Opinion for Appl PCT/GB2016/053420 dated Jan. 16, 2017, 15 pages.
European Search Report for Appl EP15275228.3 dated May 12, 2016, 10 pages.
Fundamental of HVAC Controls, Jan. 5, 2012 (Jan. 5, 2012), XP055268028, retrieved from the Internet: URL:https://web.archive.org/web/20120105130448/http://www.cs.berkeley.edu/~culler/cs294-f09/m197content.pdf, p. 52.
European Search Report for Appl EP15275229.1 dated May 9, 2016, 5 pages.
European Search Report for Appl EP15275230.9 dated May 12, 2016, 10 pages.
European Search Report for Appl EP15275231.7 dated Dec. 8, 2015, 8 pages.
Combined Search and Examination Report for Appl GB1519605.8 dated May 5, 2016, 5 pages.
Combined Search and Examination Report for Appl GB1519607.4 dated May 5, 2016, 5 pages.
Combined Search and Examination Report for Appl GB1519609.0 dated May 5, 2016, 5 pages.
Combined Search and Examination Report for Appl GB1519610.8 dated May 5, 2016, 5 pages.
Search Report for Appl GB1618599.3 dated Apr. 27, 2017, 4 pages.
International Preliminary Report on Patentability of International Application No. PCT/GB2016/053416, dated May 8, 2018, 11 pages.
International Preliminary Report on Patentability of International Application No. PCT/GB2016/053420, dated May 8, 2018, 10 pages.
International Preliminary Report on Patentability of International Application No. PCT/GB2016/053412, dated May 8, 2018, 8 pages.
International Preliminary Report on Patentability of International Application No. PCT/GB2016/053419, dated May 8, 2018, 8 pages.

* cited by examiner

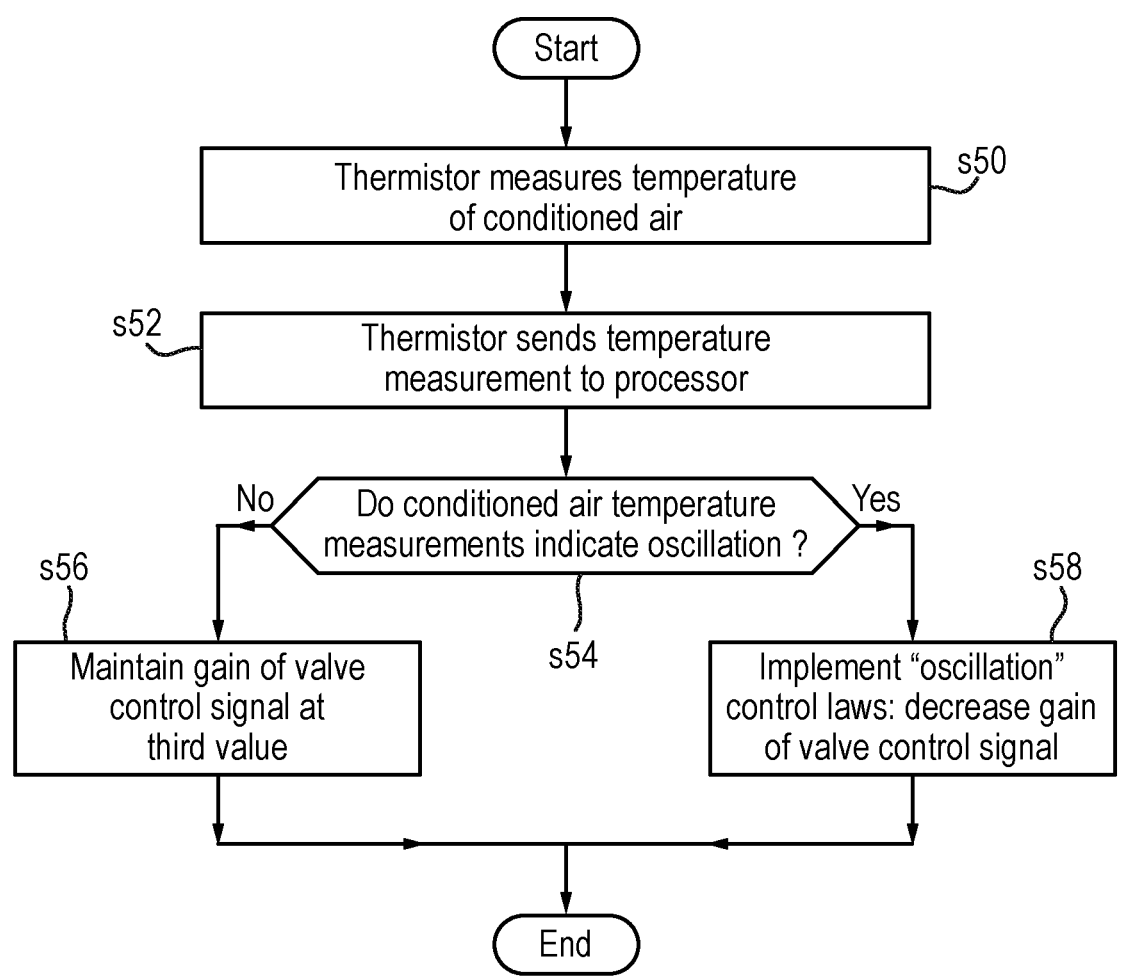

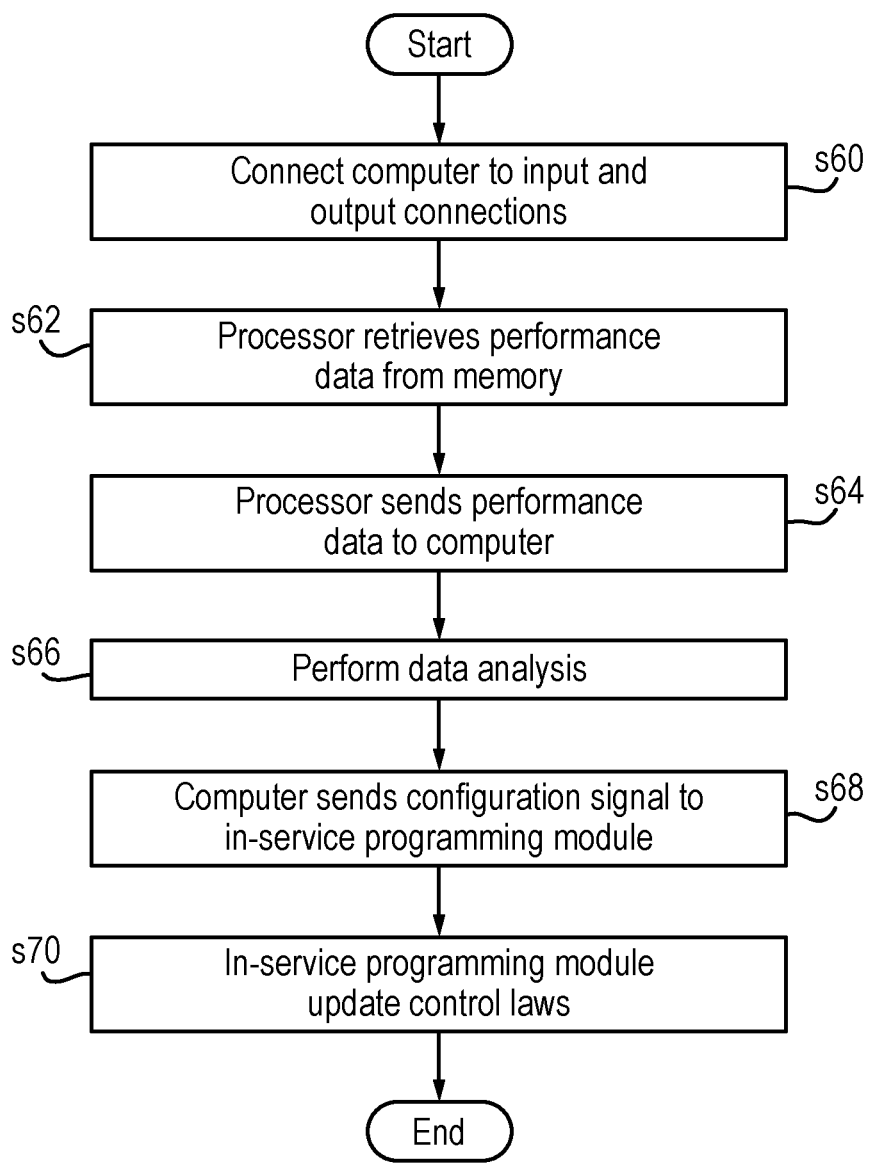

AIRCRAFT ENVIRONMENTAL CONTROL SYSTEM

RELATED APPLICATIONS

This application is a national phase application filed under 35 USC § 371 of PCT Application No. PCT/GB2016/053412 with an International filing date of Nov. 3, 2016 which claims priority of GB Patent Application 1519607.4 filed Nov. 6, 2015 and EP Patent Application 15275229.1 filed Nov. 6, 2015. Each of these applications is herein incorporated by reference in its entirety for all purposes.

FIELD OF THE INVENTION

The present invention relates to aircraft environmental control systems.

BACKGROUND

Many aircraft include environmental control systems.

Environmental control systems may be used to provide thermal control to other aircraft subsystems including, but not limited to, an aircrew workspace and equipment on-board the aircraft. For example, environmental control systems may be used to provide cooling air to a cockpit and/or mission computers of an aircraft.

Environmental control systems may provide thermal control of other aircraft subsystems by mixing relatively hot air that is bled from, for example, a compressor stage of a gas turbine engine of the aircraft (i.e. "bleed air") with relatively cold, refrigerated air.

Many aircraft, for example Hawk aircraft, include analogue environmental control systems.

SUMMARY OF THE INVENTION

The present inventors have realised that temperatures on an aircraft tend to be dependent upon a throttle setting of the aircraft engine.

The present inventors have further realised that air flows experienced by the aircraft tend to be dependent upon a throttle setting of the aircraft engine.

The present inventors have further realised that it would be beneficial to improve the responsiveness of the environmental control systems on many aircraft (for example on Hawk aircraft) to facilitate accounting for typical changes in throttle setting during aircraft operation.

In a first aspect, the present invention provides an aircraft environmental control system for controlling a temperature of a fluid (e.g. a conditioned air supply for supplying cooling/heating to systems on board the aircraft). The control system comprises: a temperature sensor configured to measure a temperature of the fluid and to generate a first signal, the first signal being indicative of the measured temperature; a control signal generator configured to, dependent upon the first signal, generate a control signal for controlling the temperature of the fluid (e.g. to control means for controlling the temperature of the fluid); and one or more processors configured to, responsive to determining that the measured temperature is less than or equal to a pre-determined threshold value, increase a gain of the control signal generator.

The pre-determined threshold value may be less than or equal to 0° C.

The fluid may be a mixture comprising a second fluid and a third fluid. The environmental control system may further comprise a valve for mixing the second fluid and the third fluid. The control signal generator may be configured to, using the first signal, generate a control signal for controlling the valve. The one or more processors may be configured to, responsive to determining that the measured temperature is less than or equal to the pre-determined threshold value, increase a gain of the control signal generator, thereby increasing an amplitude and/or power of the control signal generated by the control signal generator. The second fluid may comprise bleed air from a subsystem of the aircraft. The third fluid may comprises refrigerated bleed air and/or ambient air.

The one or more processors may be further configured to: determine that the measured temperature is oscillating about a central value; and, responsive to the determining that the measured second temperature is oscillating about a central value, decrease the gain of the control signal generator.

The aircraft environmental control system may further comprise: one or more control laws, the control laws being for use by the one or more processors when generating the control signal; a transmitter configured to transmit, from the aircraft environmental control system, for use by one or more entities remote from the aircraft environmental control system, performance data, the performance data including data selected from the group of data consisting of: one or more measured values of the temperature, data indicative of the first signal, data indicative of a gain of the control signal generator, and data indicative of the control signal; and a receiver configured to receive, responsive to the transmitter transmitting the performance data, from the one or more entities remote from the aircraft environmental control system, update information for use by the one or more processors; and means for, using the update information, updating the one or more control laws.

The control system may further comprise an amplifier configured to amplify the first signal. The control signal generator may be configured to generate the control signal using the amplified first signal. The one or more processors may be further configured to, responsive to determining that a temperature of an operational environment of the amplifier is not within a predetermined temperature range, modify a gain of the amplifier. The aircraft environmental control system may further comprise: a housing; and a second temperature sensor configured to measure the temperature of the operational environment of the amplifier within the housing. The amplifier, the second temperature sensor, and the one or more processors may be located within the housing. The aircraft environmental control system may further comprise a baseline signal generation module configured to generate a baseline signal, the baseline signal being independent of the temperature of the operational environment of the amplifier. The amplifier may be further configured to amplify the baseline signal. The one or more processors may be further configured to, responsive to determining that the temperature of an operational environment of the amplifier is not within the predetermined temperature range, modify the gain of the amplifier using the amplified baseline signal. The baseline signal generation module may comprise a resistor having substantially constant resistance. The baseline signal may be indicative of a resistance of the resistor. The environmental control system may further comprise a relay switchable between a first mode and a second mode. In its first mode, the relay may connect the first temperature sensor to the amplifier and disconnect the baseline signal generation module from the amplifier. In its second mode, the relay may connect the baseline signal generation module to the amplifier and disconnect the first temperature sensor from the amplifier. The one or more processors may be further configured to, dependent on the measurements by the second temperature sensor, control the switching of the relay. The one or more processors may be further configured to, responsive to determining that the temperature of an operational environment of the amplifier is not within the predetermined temperature range, control the relay to switch from its first mode to its second mode.

The environmental control system may be on an aircraft, e.g. a Hawk aircraft.

In a further aspect, the present invention provides an aircraft comprising an aircraft environmental control system according to any preceding aspect.

In a further aspect, the present invention provides an aircraft environmental control method for controlling a temperature of a fluid. The method comprises: measuring a temperature of the fluid; generating a first signal, the first signal being indicative of the measured temperature; generating, by a control signal generator, dependent upon the first signal, a control signal for controlling the temperature of the fluid; determining that the measured temperature is less than or equal to a pre-determined threshold value; and responsive to determining that the measured temperature is less than or equal to the pre-determined threshold value, increasing a gain of the control signal generator.

BRIEF DESCRIPTION OF THE DRAWINGS

FIG. 7 is a process flow chart showing certain steps of an oscillation avoidance process; and FIG. 8 is a process flow chart showing certain steps of a process of improving control laws with which the environmental control system is controlled.

DETAILED DESCRIPTION

Figure 1:
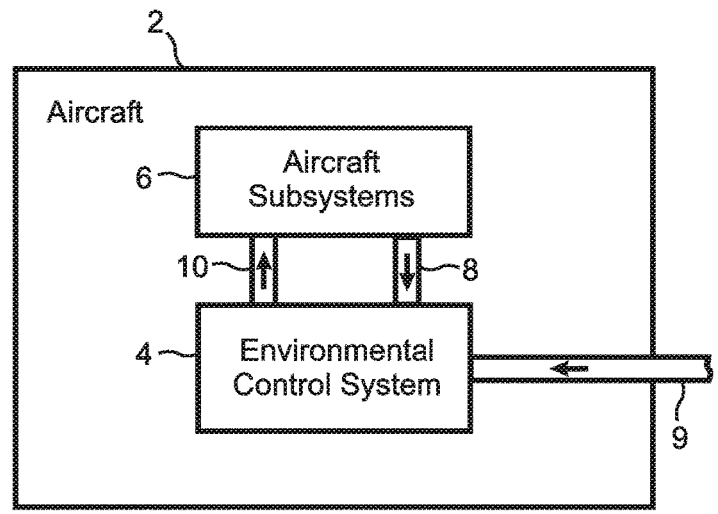
FIG. 1 is a schematic illustration (not to scale) of an aircraft.

FIG. 1 is a schematic illustration (not to scale) of an aircraft 2 in which an embodiment of an environmental control system 4 is implemented.

In this embodiment, the aircraft 2 is a Hawk aircraft, for example a Mk 127, Mk 128, Mk 132, Mk 165, Mk166, or later variant of a Hawk aircraft.

The aircraft 2 comprises the environmental control system 4 and one or more aircraft subsystems that are to be cooled by the environmental control system 4. The one or more aircraft subsystems that are to be cooled are hereinafter collectively referred to as the "aircraft subsystems" and are indicated in FIG. 1 by a single box and the reference numeral 6.

The environmental control system 4 is described in more detail later below with reference to FIG. 2.

The environmental control system 4 is connected to the aircraft subsystems 6 via a bleed air channel 8. Bleed air from the aircraft subsystems 6 is sent from the aircraft subsystems 6 to the environmental control system 4 via the bleed air channel 8. In particular, in this embodiment the aircraft subsystems 6 includes an engine of the aircraft 2. Bleed air from the aircraft engine, e.g. from a compressor stage of a gas turbine engine of the aircraft 2, is sent from the engine to the to the environmental control system 4 via the bleed air channel 8. The bleed air may have a temperature of e.g. 350° C.

The environmental control system 4 is further coupled to an ambient air channel 9. The ambient air channel 9 is in fluid communication with air external to the aircraft 2 such that the environmental control system 4 receives ambient air via the ambient air channel 9. The ambient air channel 9 may include a ram air inlet via which ambient air enters the ambient air channel 9.

In this embodiment, as described in more detail later below, the ambient air is used to cool a portion of the bleed air to produce "cooling air". This relatively cold cooling air is combined with another portion of the relatively hot bleed air to produced "conditioned air".

The environmental control system 4 is further connected to the aircraft subsystems 6 via a conditioned air channel 10. The conditioned air is sent from the environmental control system 4 to the aircraft subsystems 6 via the conditioned air channel 10.

The aircraft subsystems 6 may include a cockpit of the aircraft 2. Conditioned air may be directed from the environmental control system 4 to the aircraft cockpit via the conditioned air channel 10.

In this embodiment, the bleed air is air that has been heated by one or more of the aircraft subsystems 6. The bleed air is relatively hot compared to the cooling air and the conditioned air. The conditioned air sent from the environmental control system 4 to the aircraft subsystems 6 is used to cool one or more of the aircraft subsystems 6.

Figure 2:
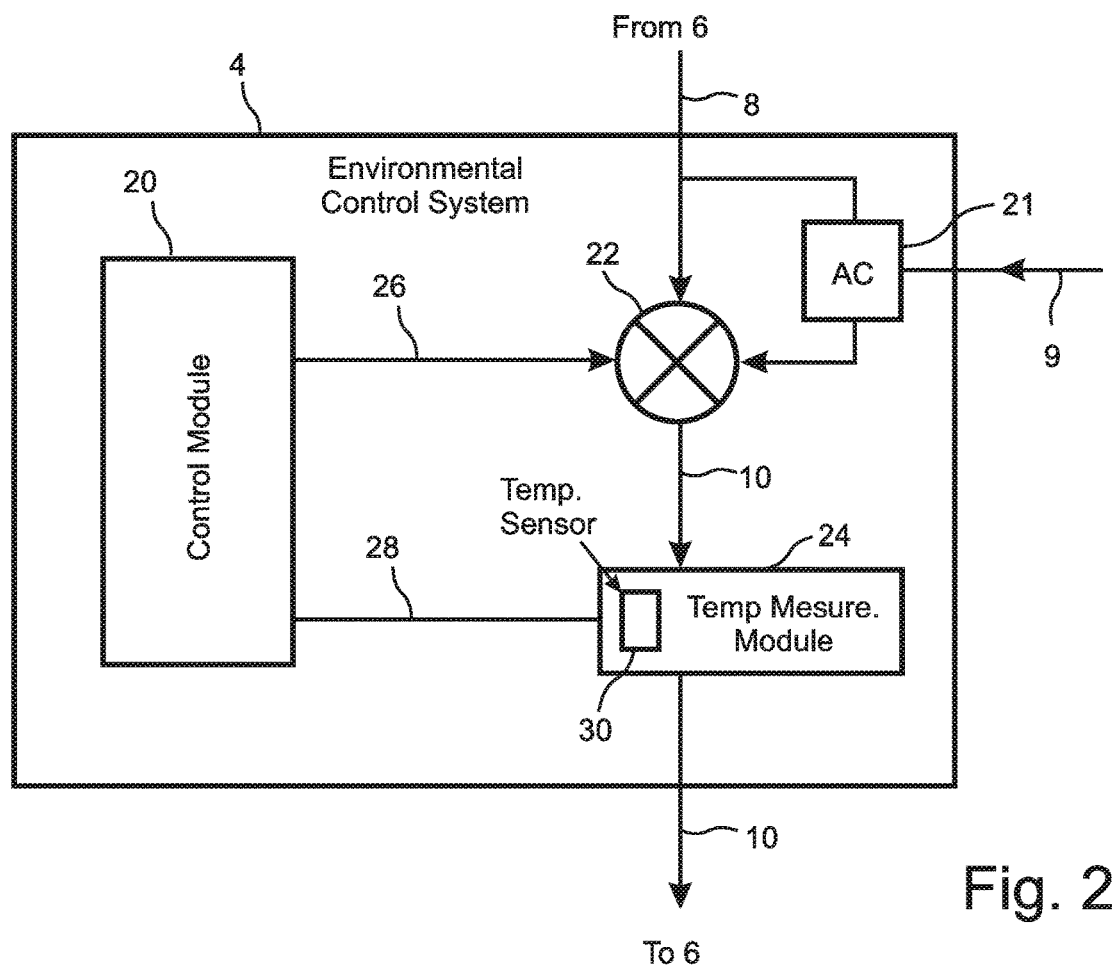
FIG. 2 is a schematic illustration (not to scale) showing further details of an environmental control system of the aircraft.

FIG. 2 is a schematic illustration (not to scale) showing further details of the environmental control system 4.

In this embodiment, the environmental control system 4 comprises a control module 20, an air conditioning module 21, a valve 22, and a temperature measurement module 24.

The control module 20 is described in more detail later below with reference to FIG. 3.

The control module 20 is connected to the valve 22 via a first electrical connection 26 such that a valve control signal may be sent from the control module 20 to the valve 22. Determination of the valve control signal by the control module 20 is described in more detail later below with reference to FIGS. 3 and 4.

In this embodiment, the valve control signal is a pulse-width modulation (PWM), or pulse-duration modulation (PDM) signal.

In this embodiment, the valve control signal is a digital signal. Use of a digital valve control signal tends to provide for improved valve control compared to conventional analogue signals. The control module 20 is further connected to the temperature measurement module 24 via a second electrical connection 28. The control module 20 is connected to the temperature measurement module 24 such that an electrical signal may be sent from the temperature measurement module 24 to the control module 20, as described in more detail later below.

The air conditioning module 21 is connected to the bleed air channel such that air conditioning module 21 receives some of the hot bleed air from the aircraft engine. The air conditioning module 21 is connected to the ambient air channel 9 such that the air conditioning module 21 receives the ambient air. The air conditioning module 21 cools the received hot bleed air by compressing, cooling (using the received ambient air), and subsequently expanding the bleed air, thereby producing cooling air. The air conditioning module 21 is further connected to the valve 22 such that the air conditioning module 21 may send the cooling air to the valve 22. In this embodiment, the cooling air has sub-zero temperature e.g. −30° C.

In this embodiment, the valve 22 is connected to the bleed air channel 8 such that the valve 22 receives bleed air from the aircraft subsystems 6. Also, the valve 22 is connected to the air conditioning module 21 such that the valve 22 receives the cooling air. The valve 22 is configured to mix the received bleed air with the cooling air to produce the conditioned air. The valve 22 is operable such that the proportions in which the bleed air and the cooling air are mixed may be varied.

The valve 22 is connected to the conditioned air channel 10. The valve 22 outputs mixed bleed air and cooled conditioned air into the conditioned air channel 10 as the conditioned air. In other words, in this embodiment the conditioned air is a mixture of the bleed air and the cooling air.

In this embodiment, the valve 22 is controlled by the valve control signal sent to the valve 22 from the control module 20. The valve control signal controls the position of the valve 22. In other words, valve control signal control controls the proportions in which the bleed air and the cooling air are mixed to produce the conditioned air.

In this embodiment, the temperature measurement module 24 is positioned within the conditioned air channel 10 downstream of the valve 22.

The temperature measurement module 24 comprises a thermistor 30.

The thermistor 30 is configured to measure a temperature of the conditioned air within the conditioned air channel 10 that has been output by the valve 22. The temperature measurement module 24 is connected to the control module 20 such that the temperature measurement taken by the thermistor 30 is sent to the control module 20 via the second electrical connection 28.

In operation, an electrical signal indicative of the resistance of the thermistor 30 (i.e. that is indicative of the temperature of the conditioned air) is output by the temperature measurement module 24 to the control module 20 via the second electrical connection 28.

Figure 3:
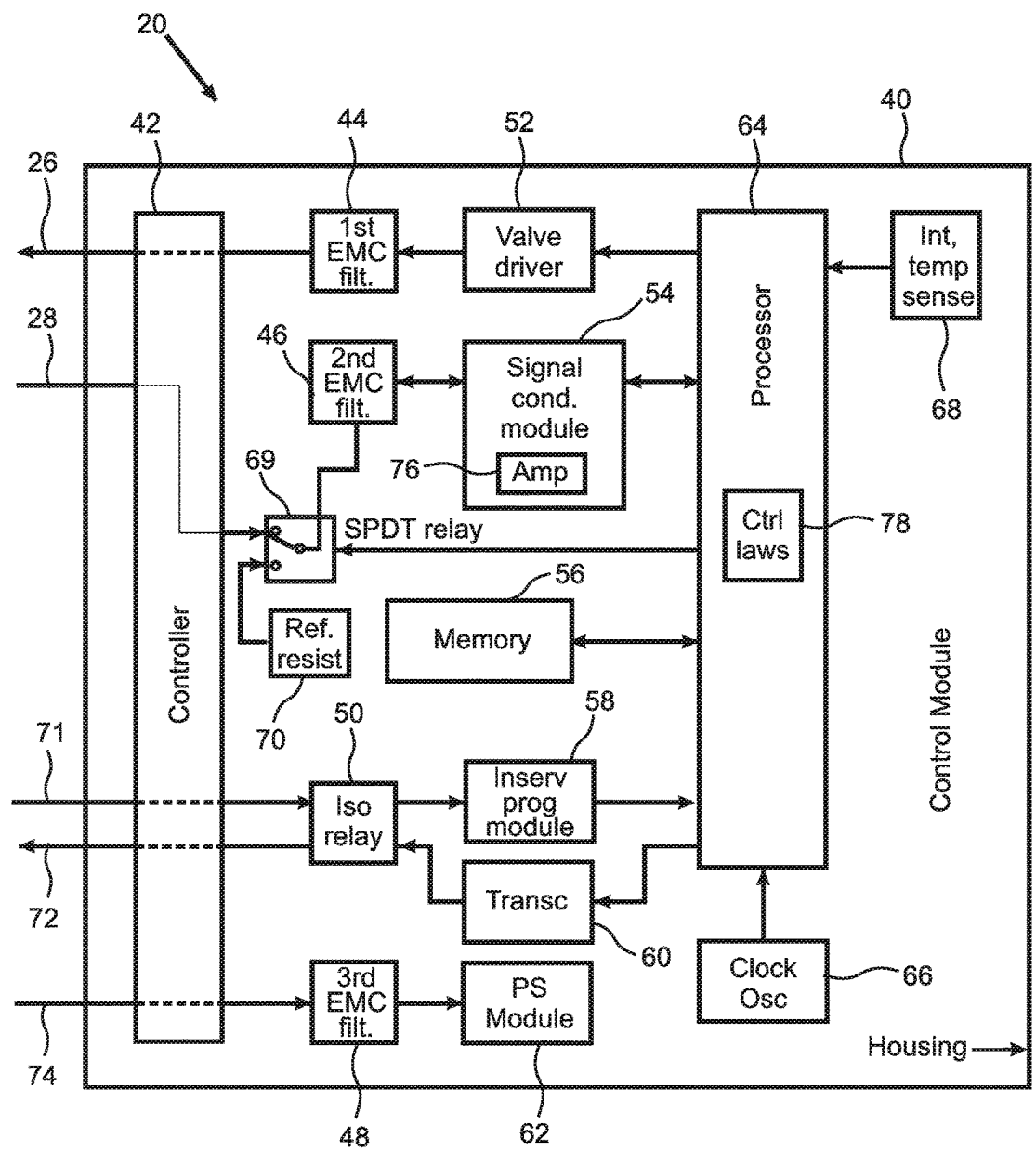
FIG. 3 is a schematic illustration (not to scale) showing further details of a control module of the aircraft.

FIG. 3 is a schematic illustration (not to scale) showing further details of the control module 20.

In this embodiment, the control module 20 comprises a housing 40, a controller 42, a first electromagnetic compatibility (EMC) filter 44, a second EMC filter 46, a third EMC filter 48, an isolating relay 50, a valve driver 52, a signal conditioning module 54, a memory 56, an in-service programming module 58, a transceiver 60, a power supply module 62, a processor 64, a clock oscillator 66, an internal temperature sensor 68, a single pole, double throw (SPDT) relay 69, and a reference resistor 70.

The housing 40 contains the other components 42-70 of the control module 20. In this embodiment, the housing 40 is made of metal, for example, aluminium. However, in other embodiments, the housing is made of a different appropriate material such as plastics.

In this embodiment, the controller 42 is an interface module that, in operation, receives various signals from entities remote from the control module 20. The controller 42 is configured to distribute the signals received from these remote entities to relevant components of the control module 20. Also, in operation, the controller 42 receives various signals from various other components of the control module 20. The controller 42 is configured to distribute the signals received from other components of the control module 20 to relevant entities remote from the control module 20.

The controller 42 is connected to the first electrical connection 26 such that the valve control signal may be sent from the controller 42 to the valve 22 via the first electrical connection 26.

The controller 42 is coupled to the first EMC filter 44 such that electrical signals (in particular, the valve control signal in this embodiment) may be sent between the controller 42 and the first EMC filter 44.

The controller 42 is connected to the second electrical connection 28 such that electrical signals may be sent between the controller 42 and temperature measurement module 24 via the second electrical connection 28.

The controller 42 is coupled to a first terminal of the SPDT relay 69 such that electrical signals (in particular, the temperature measurements in this embodiment taken by the thermistor 30) may be sent from the controller 42 to the first terminal of the SPDT relay 69.

The controller 42 is further configured to receive, via an input connection 71, a configuration signal. The configuration signal may be received by the controller 42 from a computer (such as a laptop, or tablet computer) remote from the aircraft 2, as described in more detail later below with reference to FIG. 8.

The controller 42 is further configured to send, via an output connection 72, performance data. The performance data may be sent from the controller 42 to the computer that is remote from the aircraft 2, as described in more detail later below with reference to FIG. 8.

The controller 42 is coupled to the isolating relay 50 such that electrical signals (in particular, the configuration signal and the performance data in this embodiment) may be sent between the controller 42 and the isolating relay.

The controller 42 is further configured to receive, via a power input 74, electrical power. The electrical power may be 28V electrical power. The electrical power may be received by the controller 42 from a power source remote from the control module 20 and on the aircraft 2.

In addition to being connected to the controller 42, the first EMC filter 44 is connected to the valve driver 52 such that electrical signals (in particular, the valve control signal in this embodiment) may be sent between the first EMC filter 44 and the valve driver 52. The first EMC filter 44 is configured to filter electrical signals received from the valve driver 52, thereby improving electromagnetic compatibility between the control module 20 and the valve 22.

In addition to its first terminal being connected to the controller 42, a second terminal of the SPDT relay 69 is connected to the reference resistor 70 such that an electrical signal (in particular, a "baseline signal") may be sent from the reference resistor 70 to the second terminal of the SPDT relay 69. In addition to the first and second terminals, the SPDT relay 69 comprises a third terminal. The third terminal of the SPDT relay 69 is a common terminal that may be switched from being connected to the first terminal to being connected to the second terminal and vice versa. In this embodiment, the third (i.e. the common) terminal of the SPDT relay 69 is connected to the second EMC filter 46 such that electrical signals (in particular, depending upon the state of the SPDT relay 69, either the temperature measurements of the thermistor or the baseline signal) may be sent from the third terminal of the SPDT relay 69 to the second EMC filter 46.

The SPDT relay 69 is further connected to the processor 64 such that a relay control signal for controlling the SPDT relay 69 may be sent from the processor 64 to the SPDT relay 69. The relay control signal controls the state of the SPDT relay 69, i.e. which of the first or second terminals the third (common) terminal is connected to.

In this embodiment, the reference resistor 70 is a 10K precision stabilised resistor. In other embodiments, a different means for generating a stable baseline signal is implemented instead of or in addition to the reference resistor 70.

In addition to being connected to the third terminal of the SPDT relay 69, the second EMC filter 46 is connected to the signal conditioning module 54 such that electrical signals (in particular, depending upon the state of the SPDT relay 69, either the temperature measurements of the thermistor or the baseline signal) may be sent from the second EMC filter 46 to the signal conditioning module 54. The second EMC filter 46 is configured to filter electrical signals sent to the signal conditioning module 54, thereby improving electromagnetic compatibility between the control module 20 and the temperature measurement module 24.

In addition to being connected to the controller 42, the isolating relay 50 is connected to the in-service programming module 58 and the transceiver 60 such that electrical signals may be sent between the isolating relay 50 and each of the in-service programming module 58 and the transceiver 60. The isolating relay 50 is configured to direct to the configuration signal to the in-service programming module 58. Also, the isolating relay 50 is configured to receive the performance data from the transceiver and direct the performance data to the controller 42. In this embodiment, the isolating relay 50 is configured to isolate the in-service programming module 58 and the transceiver 60 from incoming signals while the aircraft is in flight. In other words, the isolating relay 50 prevents or opposes signals being input to the in-service programming module 58 and output by the transceiver 60 during aircraft flight. Thus, updating of control laws 78 implemented by the processor 64 (which will be described in more detail later below) while the aircraft 2 is in flight tends to be prevented.

In addition to being connected to the controller 42, the third EMC filter 48 is connected to the power supply module 62 such that electrical power may be sent from the third EMC filter 48 to the power supply module 62. The third EMC filter 48 is configured to filter electrical signals passing between the controller 42 and the power supply module 62, thereby improving electromagnetic compatibility between the control module 20 and the power source. The power supply module 62 is configured to supply electrical power to the other component of the control module 42-60, 64-70.

In addition to being connected to the first EMC filter 44, the valve driver 52 is connected to the processor 64 such that electrical signals (for example, an output of the processor 64) may be sent between the valve driver 52 and the processor 64. The valve driver 52 is configured to, using the output of the processor 64, determine the valve control signal.

In addition to being connected to the second EMC filter 46, the signal conditioning module 54 is connected to the processor 64 such that electrical signals may be sent between the signal conditioning module 54 and the processor 64. The signal conditioning module 54 comprises an amplifier 76. In this embodiment, the amplifier 76 is configured to amplify a temperature measurement signal received by the signal conditioning module 54 from the thermistor 30. The signal conditioning module 54 is configured to output the amplified temperature measurement signal to the processor 64. The signal conditioning module 54 may comprise one or more filters and/or analogue-to-digital converters.

In this embodiment, the memory 56 is a non-volatile random access memory. The memory 56 is connected to the processor 64 such that the processor may store data (for example, performance data) in the memory, and such that the processor 64 may retrieve data from the memory 56.

In addition to being connected to the isolating relay 50, the in-service programming module 58 is connected to the processor 64 such that electrical signals (in particular, the configuration signals in this embodiment) may be sent between the in-service programming module 58 and the processor 64. The in-service programming module 58 is configured to process received configuration signals, and update or reconfigure the control laws 78 using the received configuration signal.

In addition to being connected to the isolating relay 50, the transceiver 60 is connected to the processor 64 such that electrical signals (in particular, the performance data in this embodiment) may be sent between the processor 64 and the transceiver 64. The transceiver 64 is configured to transmit received performance data to the computer that is remote from the aircraft 2 via the isolating relay 50.

In this embodiment, the processor 64 comprises the set of control laws 78. The processor 64 implements the control laws 78 to process incoming signals. The control laws 78 and the functionality of the processor 64 is described in more detail later below with reference to FIGS. 4 to 7. The processor 64 is further configured to generate a relay control signal, and output the relay control signal to control the SPDT relay 69 as described in more detail later below.

The clock oscillator 66 is configured to generate a clock signal. The clock oscillator 66 is connected to the processor 64 such that the processor 64 may receive the clock signal from the clock oscillator 66. The clock signal is used to drive a clock of the processor 64.

The internal temperature sensor 68 is configured to measure a temperature inside the housing 40, i.e. to measure a temperature of the environment inside the housing 40. Thus, in this embodiment, the internal temperature sensor 68 measures a temperature of the operational environment of, inter alia, the amplifier 76. The internal temperature sensor 68 is connected to the processor 64 such that the processor 64 may receive the temperature measurement taken by the internal temperature sensor 68. In this embodiment, the internal temperature sensor 68 periodically, e.g. once per second.

Apparatus, including the processor 64, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 4:
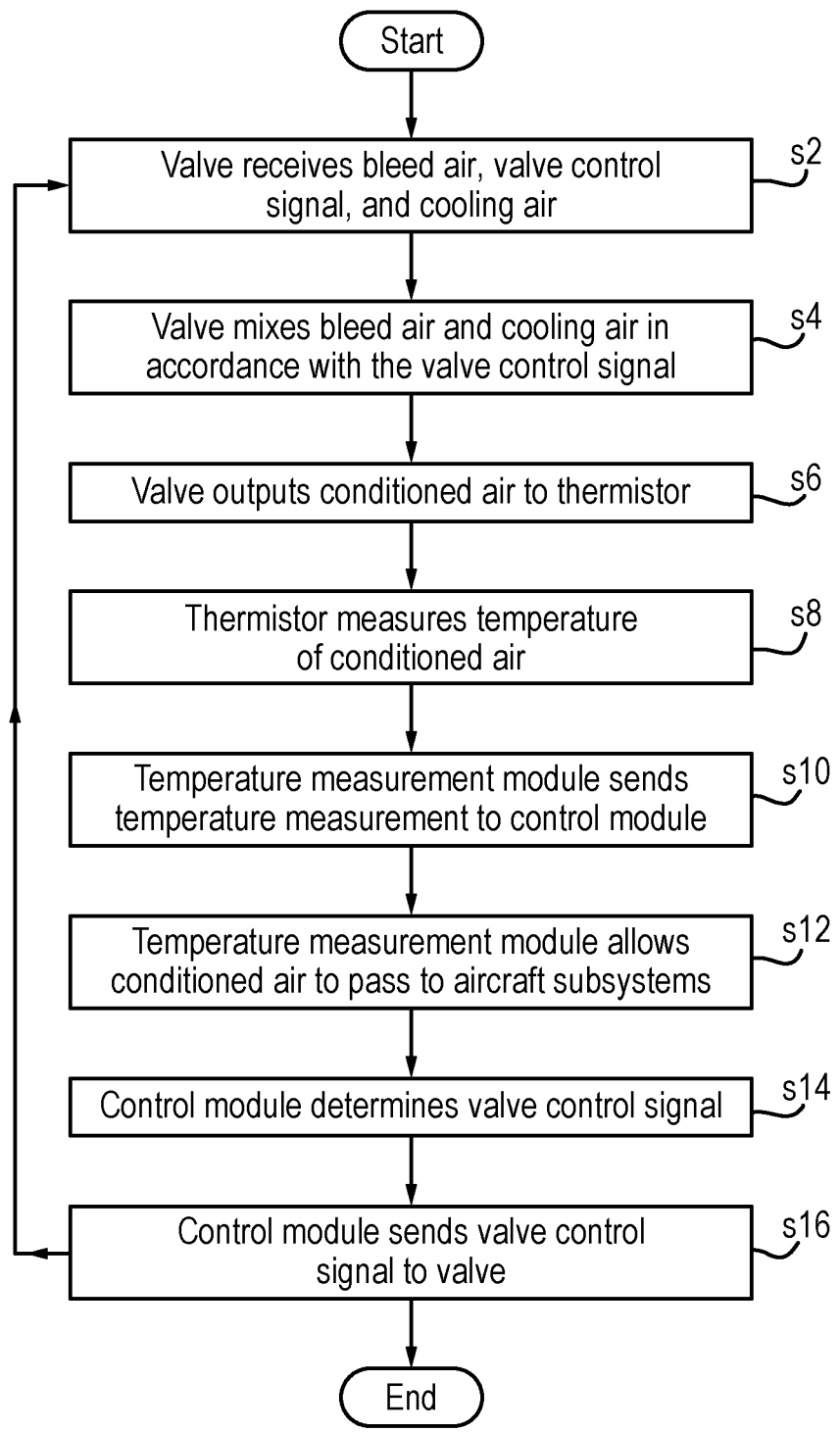
FIG. 4 is a process flow chart showing certain steps of a control process of the environmental control system.

FIG. 4 is a process flow chart showing certain steps of a control process for controlling a temperature of the conditioned air in the conditioned air channel 10.

At step s2, the valve 22 receives bleed air from the aircraft subsystems 6 via the bleed air channel 8, and cooling air from the air conditioning module 21. The valve 22 further receives a valve control signal from the valve driver 52 via the first EMC filter 44, the controller 42, and the first electrical connection 26.

The valve control signal specifies a rate of change of position of the valve 22.

At step s4, the valve 22 operates in accordance with the received valve control signal. The proportions in which the hot bleed air and the cooling air are mixed is dependent upon the position of the valve 22. The valve 22 mixes the bleed air and the cooling air in accordance with the received valve control signal to produce the conditioned air.

At step s6, the valve outputs the conditioned air (i.e. mixture of the bleed air and the cooling air) to the conditioned air channel 10.

At step s8, the thermistor 30 located in the conditioned air channel 10 measures a temperature of the conditioned air output by the valve 22.

At step s10, the temperature measurement module 24 sends the measurement of the temperature of the conditioned air to the processor 64 of the control module 20.

In particular, in this embodiment, the temperature measurement module 24 sends the measurement of the temperature of the conditioned air to controller 42 as an electrical signal via the second electrical connection 28. This measurement signal is sent by the controller 42 to the signal conditioning module 54 via the SPDT relay 69 (which is in a state whereby the first terminal is connected to the third terminal) and the second EMC filter 46. The signal conditioning module 54 processes the measurement signal to be in an appropriate format for the processor 64. This includes amplifying the measurement signal by the amplifier 76. The signal conditioning module 54 then sends the processed measurement signal to the processor 64.

The processor 64 may store the received measurements of the temperature of the cooling air at the memory 56 as performance data.

At step s12, the conditioned air passes to the aircraft subsystems 6 via the conditioned air channel 10, thereby cooling the aircraft subsystems 6.

At step s14, using the received measurement of the temperature of the conditioned air, the processor 64 and the valve driver 52 determine an updated valve control signal for controlling the position of the valve 22.

In particular, in this embodiment the processor 64 uses the control laws 78 to process the measurement of the temperature of the conditioned air.

In this embodiment, the control laws 78 include laws and/or rules that specify the following.

Firstly, the control laws 78 specify that, if the measured value of the temperature of the conditioned air is within a first predetermined temperature range, the current position of the valve 22 is to be maintained. In this embodiment, the first predetermined temperature range is the range 4° C.+/− 2° C., i.e. between 2° C. and 6° C. However, in other embodiments, the first predetermined temperature range may be a different range of temperature values.

Secondly, the control laws 78 specify that, if the measured value of the temperature of the conditioned air is below the first predetermined temperature range, the position of the valve 22 is to be changed to increase the proportion of the relatively hot bleed air in the conditioned air, and to decrease the proportion of the cooling air in the conditioned air. Thus, if the measured value of the temperature of the conditioned air is below the first predetermined temperature range, the valve 22 is to be controlled so that the temperature of the conditioned air is increased. In this embodiment, the change in position of the valve 22 may be proportional to the measured conditioned air temperature. For example the control laws 78 may specify that, if the measured value of the temperature of the conditioned air is below the first predetermined temperature range by a relatively small amount, the position of the valve 22 is to be changed by a relatively small amount so that the proportion of the bleed air in the conditioned air is increased by a relatively small amount. The control laws 78 may further specify that, if the measured value of the temperature of the cooling air is below the first predetermined temperature range by a relatively large amount, the position of the valve 22 is to be changed by a relatively large amount so that the proportion of the bleed air in the conditioned air is increased by a relatively large amount. The control laws 78 may include a first function that specifies an amount by which to change the position of the valve 22 if the measured value of the temperature of the conditioned air is below the first predetermined temperature range. The first function may be function of the measured value of the temperature of the conditioned air. In some embodiments, the first function is a linear function.

Thirdly, the control laws 78 specify that, if the measured value of the temperature of the conditioned air is above the first predetermined temperature range, the position of the valve 22 is to be changed to decrease the proportion of the relatively hot bleed air in the conditioned air, and to increase the proportion of the cooling air in the conditioned air. Thus, if the measured value of the temperature of the conditioned air is above the first predetermined temperature range, the valve 22 is to be controlled so that the temperature of the conditioned air is decreased. In this embodiment, the change in position of the valve 22 may be proportional to the measured conditioned air temperature. For example the control laws 78 may specify that, if the measured value of the temperature of the conditioned air is above the first predetermined temperature range by a relatively small amount, the position of the valve 22 is to be changed by a relatively small amount so that the proportion of the cooling air in the conditioned air is increased by a relatively small amount. The control laws 78 may further specify that, if the measured value of the temperature of the conditioned air is above the first predetermined temperature range by a relatively large amount, the position of the valve 22 is to be changed by a relatively large amount so that the proportion of the cooling air in the conditioned air is increased by a relatively large amount. The control laws 78 may include a second function that specifies an amount by which to change the position of the valve 22 if the measured value of the temperature of the conditioned air is above the first predetermined temperature range. The second function may be function of the measured value of the temperature of the conditioned air. In some embodiments, the second function is a linear function.

Furthermore, in this embodiment, the control laws 78 specify that, if one or more certain criteria are met, a brief maximum PWM signal is applied to the valve 22. Examples of such criteria include, but are not limited to, a criterion that the valve 22 is to change direction, or to a criterion that the valve 22 is to open from a static condition. This application of a maximum PWN signal as the valve control signal to the valve 22 advantageously tends to overcome inertia of the valve 22.

Thus, in this embodiment the processor 64 implements the control laws 78 and processes the measurement of the temperature of the cooling air to determine a rate in which to change the position of the valve 22. The processor 64 then sends the rate of change of position of the valve 22 to the valve driver 52.

Using the received position rate of change of position of the valve 22, the valve driver 52 then generates an updated valve control signal. The updated valve control signal specifies the rate of change of position of the valve 22 as determined by the processor 64.

In this embodiment, the processor 64 determines a rate of change of position of the valve 22. Thus, advantageously positional sensing on the valve 22 tends not to be used. However, in other embodiments, positional sensing on the valve 22 is used. In such embodiments, the processor 64 may determine an updated position for the valve 22, and the valve control signal generated by the valve driver 52 may specify this determined valve position.

At step s16, the valve driver 52 of the control module 20 sends the updated valve control signal to the valve 22. The valve control signal is sent from the valve driver 52 to the valve 22 via the first EMC filter 44, the controller 42, and the first electrical connection 26.

The processor 64 may log details of the generated valve control signal at the memory 56 as performance data.

After step s16, the method of FIG. 3 may return to step s2 at which the valve 22 may be repositioned in accordance with the updated valve control signal. Thus, the relative proportions of bleed air and cooling air that make up the conditioned air may be changed so that the temperature of the conditioned air is maintained within the first predetermined temperature range. Steps s2 to s16 define a control loop for controlling the valve 22 so that the temperature of the conditioned air is within the first predetermined temperature range.

Thus, a control process for controlling a temperature of the conditioned air in the conditioned air channel 10 is provided.

Figure 5:
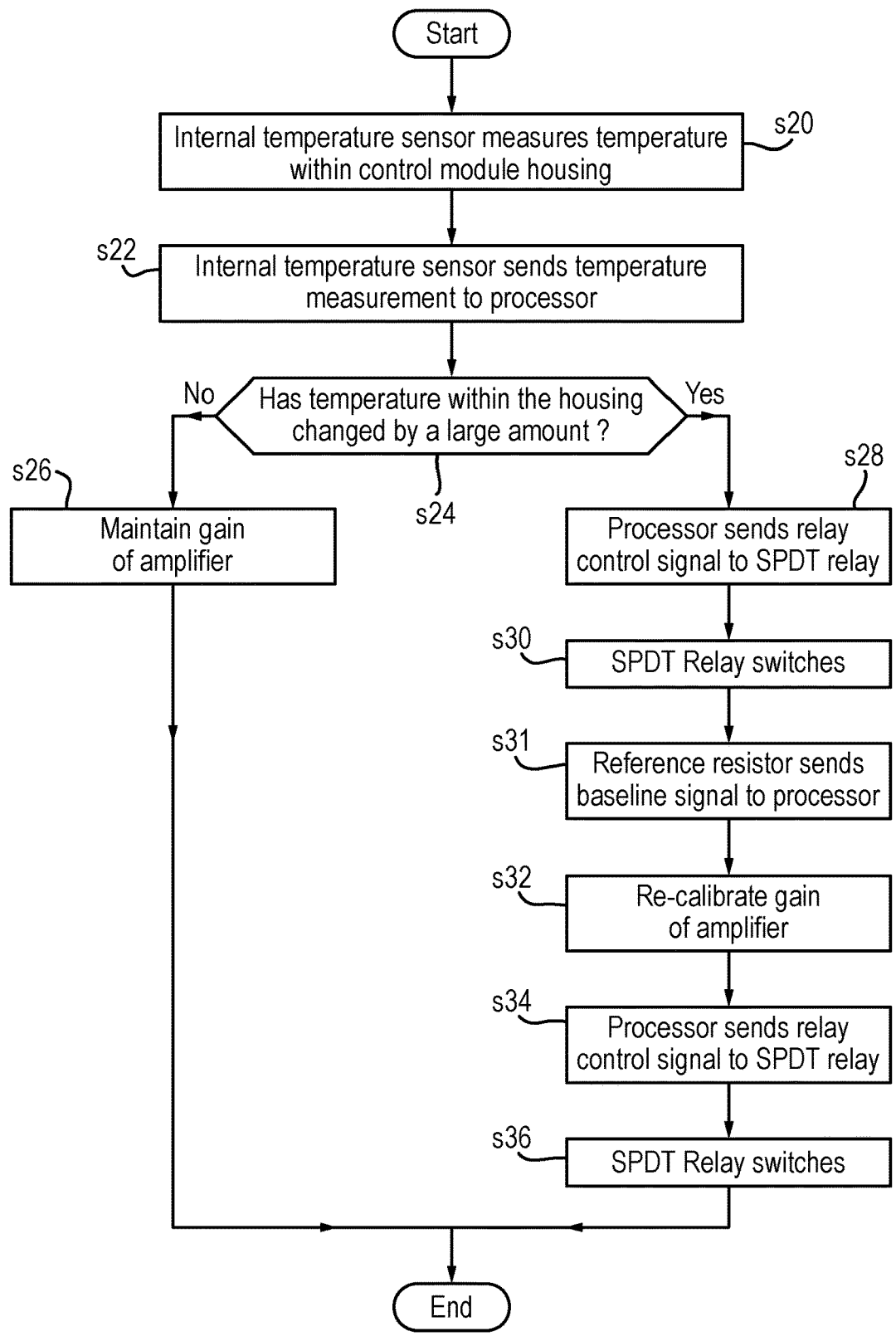
FIG. 5 is a process flow chart showing certain steps of an automatic calibration process for the control module.

FIG. 5 is a process flow chart showing certain steps of an automatic calibration process performed by the control module 20. The process of FIG. 5 may be performed at regular intervals, e.g. at a frequency of 20 Hz. This tends to ensure that the control module is correctly calibrated at all times.

Large changes in the temperature of the internal circuitry of the control module 20 can detrimentally affect the ability of the control module to correctly measure or determine the temperature of the thermistor 30. This tends to be due to the temperature sensitivity of the internal components of the control module 20. The calibration process tends to ensure that the system automatically recalibrates to correct for errors caused by the temperature sensitivity of the internal components, for example, if large internal temperature changes of the internal components of the control module 20 occur.

At step s20, the internal temperature sensor 68 measures a temperature within the housing 40.

At step s22, the internal temperature sensor 68 sends the measurement of the temperature inside the housing 40 to the processor 64.

The processor 64 may store the received internal temperature measurement at the memory 56 as performance data.

At step s24, the processor 64 determines whether or not the measured temperature inside the housing 40 to determine whether or not a large change (for example, +/−10° C., or +/−20° C.) from a predefined temperature value or temperature range in the temperature within the housing 40 has occurred.

Processing performed by the processor 64 at step s24 may be specified in the control laws 78.

If at step s24, it is determined that the measured temperature inside the housing 40 has not deviated by a large amount from the predefined temperature value or temperature range, the method proceeds to step s26.

However, if at step s24, it is determined that the measured temperature inside the housing 40 has deviated by a large amount from the predefined temperature value or temperature range, the method proceeds to step s28. Steps s28 to s36 will be described in more detail later below after a description of step s26.

In some embodiments, at step s24, the processor 64 performs a different determination instead of or in addition to determining whether or not a sufficiently large change in the temperature within the housing 40 has occurred. For example, the processor 64 may determine whether or not the temperature within the housing 40 is within a second predetermined temperature range. In some embodiments, if the temperature within the housing 40 is within the second predetermined temperature range, the method proceeds to step s26, whereas if the temperature within the housing 40 is outside the second predetermined temperature range, the method proceeds to step s28.

At step s26, the gain of the amplifier 76 is maintained at its current level.

After step s26, the process of FIG. 5 ends.

At step s28, in response to determining that the temperature inside the housing 40 has deviated by a large amount from the predefined temperature value or temperature range, the processor 64 generates and sends a relay control signal to SPDT relay 69.

The processor 64 may log details of the relay control signal at the memory 56 as performance data.

At step s30, responsive to receiving the relay control signal, the state of the SPDT relay 69 is switched. In particular, in this embodiment, the third (common) terminal of the SPDT relay 69 is switched from being connected to the first terminal (and thereby to the temperature measurement module 24) to being connected to the second terminal (and thereby to the reference resistor 70).

In this embodiment, the resistance of the reference resistor 70 is substantially fixed. In other words, the resistance of the reference resistor 70 does not vary significantly with the temperature within the housing 40.

At step s31, the reference resistor 70 sends to an electrical signal indicative of its resistance to the processor 64 via the second EMC filter 46, and the signal conditioning module 54. The electrical signal indicative of the resistance of the reference resistor 70 is amplified by the amplifier 76 of the signal conditioning module 54 prior to being received by the processor 64.

At step s32, the processor 64 recalibrates the amplifier 76 of the signal conditioning module 54.

In particular, in this embodiment, the processor 64 uses the received signal that is indicative of the resistance of the reference resistor 70 (that has been amplified by the amplifier 76), and the known resistance of the reference resistor 70 to determine a recalibration for the amplifier 76. This recalibration may be such that the received amplified signal that is indicative of the resistance of the reference resistor 70 matches the known resistance of the reference resistor 70. The processor 64 then recalibrates the amplifier 76 according to the determined recalibration.

The processor 64 may log details of amplifier recalibration at the memory 56 as performance data.

At step s34, after recalibration of the amplifier 76, the processor 64 sends a second relay control signal to the SPDT relay 69.

The processor 64 may log details of the second relay control signal at the memory 56 as performance data.

At step s36, responsive to receiving the second relay control signal, the state of the SPDT relay 69 is switched. In particular, in this embodiment, the third (common) terminal of the SPDT relay 69 is switched from being connected to the second terminal (and thereby to the reference resistor 70) to being connected to the second terminal (and thereby to the temperature measurement module 24). Thus, the processor 64 again receives temperature measurements from the thermistor 30.

After step s36, the process of FIG. 5 ends.

Thus, an automatic calibration process of the control module 20 is provided.

An advantage provided by the above described automatic calibration process is that detrimental effects of changes in temperature within the housing 40 on the performance of the control module 20 tend to be reduced or eliminated. For example, changes to the amplifier gain (and other temperature dependent components) within the housing unit. This tends to allow the control module 20 to operate effectively over an increased temperature range, for example −40° C. to +80° C.

Advantageously, the control module 20 may automatically recalibrate to account for undesirable internal temperature changes. The calibration may, for example, be performed at power-up of the control module 20, and/or when the internal temperature of the housing changes be a predetermined value (e.g. =/−20° C.).

Figure 6:
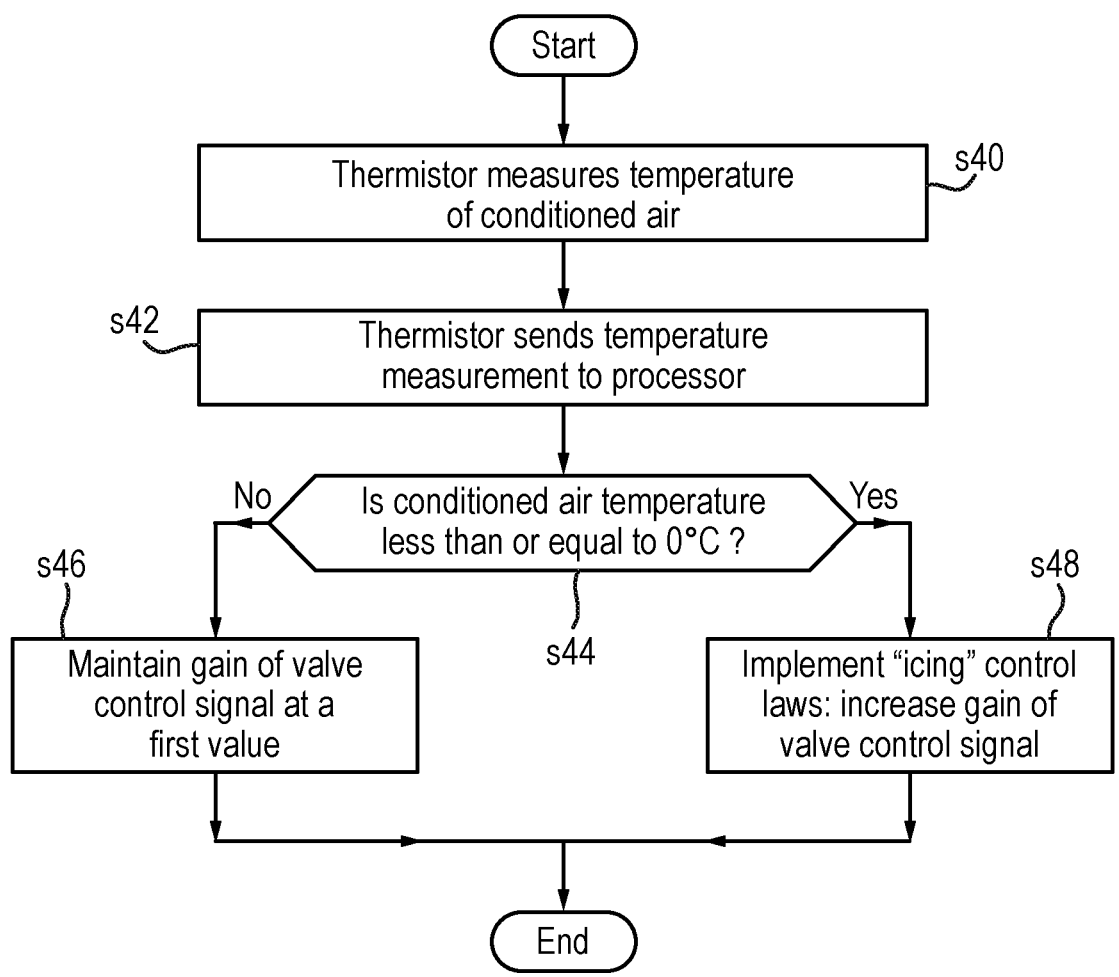
FIG. 6 is a process flow chart showing certain steps of an icing avoidance process.

FIG. 6 is a process flow chart showing certain steps of an icing avoidance process. The process of FIG. 6 may be performed at regular intervals, e.g. at a frequency of 20 Hz.

At step s40, the thermistor 30 measures a temperature of the conditioned air in the conditioned air channel 10.

At step s42, the thermistor 30 sends the measurement of the temperature of the conditioned air to the processor 64.

The processor 64 may store the received conditioned air temperature measurement at the memory 56 as performance data.

At step s44, the processor 64 determines whether or not the measured conditioned air temperature is less than or equal to 0° C.

By determining that the temperature of the conditioned air is less than or equal to 0° C., the processor 64 determines that there is a risk of ice forming within the conditioned air channel 10, and the aircraft subsystems 6 that receive the conditioned air. In other embodiments, one or more different criteria may be used to determine that there is a risk of icing instead of or in addition to the temperature measurement of the conditioned air being less than or equal to 0° C. For example, in some embodiments, a lower temperature threshold below 0° C. is used.

Processing performed by the processor 64 at step s44 may be specified in the control laws 78.

If at step s44, it is determined that the measured conditioned air temperature is greater than or equal to 0° C., the method proceeds to step s46.

However, if at step s44, it is determined that the measured conditioned air temperature is less than or equal to 0° C., the method proceeds to step s48. Step s48 will be described in more detail later below after a description of step s46.

At step s46, in response to determining that the conditioned air temperature is greater than 0° C., the processor 64 controls the valve driver 52 such that the gain of the valve driver 52 is equal to a first predetermined value. The first value may be any appropriate gain value for the valve driver 52. The first value is a constant.

The processor 64 may log detail of its control of the valve driver 52 at step s46 at the memory 56 as performance data.

In some embodiments, where no icing is detected in a previous performance of the process of FIG. 6, the first predetermined value may be a current value of the gain of the valve driver 52.

The actions performed by the processor 64 at step s46 may be specified in the control laws 78.

After step s46, the process of FIG. 6 ends.

At step s48, in response to determining that the conditioned air temperature is less than or equal to 0° C., the processor 64 controls the valve driver 52 such that the gain of the valve driver 52 is equal to a second predetermined value. The second value is greater than the first value. Thus, upon first determining that the conditioned air temperature is less than or equal to 0° C., the gain of the valve driver 52 is increased. Thus, the power and/or amplitude of the valve control signals generated by the valve driver 52 is increased.

In this embodiment, the second value is a constant that is greater than the first value. However, in other embodiments, the second value is not a constant, i.e. the second value is a variable. For example, in some embodiments, the second value is a function of the measured temperature, e.g., a linear function that increases as the measured temperature decreases.

Increasing the amplitude of the valve control signal advantageously tends to provide that the movement rate of the valve 22 is increased. Thus, when the processor 64 detects an icing risk (i.e. cooling air temperatures less than or equal to 0° C.), the rate at which the valve 22 moves is increased. Thus, the speed at which the valve 22 may increase relatively hot bleed air into the conditioned air is increased. This advantageously tends to provide that the likelihood of ice forming is reduced. Also, this advantageously tends to provide that any formed ice is rapidly melted.

The actions performed by the processor 64 at step s48 may be specified in the control laws 78.

The processor 64 may log detail of its control of the valve driver 52 at step s48 at the memory 56 as performance data.

After step s48, the process of FIG. 6 ends.

Thus, an icing avoidance process is provided.

The icing avoidance process tends to be performed automatically by the control module 20. Also, the icing avoidance process tends to be advantageously proactive, i.e. icing prevention steps tend to be performed prior to ice formation.

FIG. 7 is a process flow chart showing certain steps of an oscillation avoidance process. The process of FIG. 7 may be performed at regular intervals, e.g. at a frequency of 20 Hz.

At step s50, the thermistor 30 measures a temperature of the conditioned air within the conditioned air channel 10.

At step s52, the thermistor 30 sends the measurement of the conditioned air temperature to the processor 64.

The processor 64 may store the received conditioned air temperature measurement at the memory 56 as performance data.

At step s54, the processor 64 determines whether or not the conditioned air temperature measurements indicate that oscillation is occurring. In this embodiment, the processor 64 determines that oscillation is occurring if, over a predetermined time period, the conditioned air temperature measurements cross a predetermined central value more than a predetermined number of times. In other words, the processor 64 determines that oscillation is occurring if, within the predetermined time period, the number of times that the temperature measurements change from being above the central value to being below the central value, and/or from being below the central value to being above the central value, is greater than a predetermined threshold value. This predetermined time period may, for example, be 20s. The central value may, for example, be 4° C. The threshold value for the crossing number may, for example, be 2.

Processing performed by the processor 64 at step s54 may be specified in the control laws 78.

If at step s54, it is determined that oscillation of the conditioned air temperature is not occurring, the method proceeds to step s56.

However, if at step s54, it is determined that oscillation of the conditioned air temperature is occurring, the method proceeds to step s58. Step s58 will be described in more detail later below after a description of step s56.

At step s56, in response to determining that oscillation is not occurring, the processor 64 controls the valve driver 52 such that the gain of the valve driver 52 is equal to a third predetermined value. The third value may be any appropriate gain value for the driver 52. In this embodiment, the third value is a constant. In some embodiments, the third value is equal to the first value.

In some embodiments, where no oscillation is detected in a previous performance of the process of FIG. 7, the third predetermined value may be a current value of the gain of the valve driver 52.

The actions performed by the processor 64 at step s56 may be specified in the control laws 78.

The processor 64 may log details of its control of the valve driver 52 at step s56 at the memory 56 as performance data.

After step s56, the process of FIG. 7 ends.

At step s58, in response to determining that oscillation of the conditioned air temperature is occurring, the processor 64 controls the valve driver 52 such that the gain of the valve driver 52 is equal to a fourth predetermined value. The fourth value is less than the third value. Thus, upon first determining that oscillation of the conditioned air temperature is occurring, the gain of the valve driver 52 is decreased. Thus, the amplitude of the valve control signals generated by the valve driver 52 is decreased.

In this embodiment, the fourth value is a variable. For example, in some embodiments, the fourth value decreases as the number of oscillations increase above the threshold value for the crossing number. This tends to increase the anti-oscillation action as the detected oscillation persists. However, in other embodiments, the fourth value may be a different value, for example, a different variable value or a constant.

Decreasing the amplitude of the valve control signal advantageously tends to provide that the movement rate of the valve 22 is decreased. Thus, when the processor 64 detects oscillation of the conditioned air temperatures, the rate at which the valve 22 moves is decreased. Thus, the speed at which the valve 22 may change the relative proportions of bleed air and cooling air in the conditioned air is decreased. This advantageously tends to provide a "smoothing" effect that tends to reduce or eliminate oscillation.

The actions performed by the processor 64 at step s58 may be specified in the control laws 78.

The processor 64 may log detail of its control of the valve driver 52 at step s48 at the memory 56 as performance data.

After step s58, the process of FIG. 7 ends.

Thus, an oscillation avoidance process is provided.

The oscillation avoidance process tends to be performed automatically by the control module 20. By reducing or eliminating oscillation, the maintaining of the temperature of the conditioned air in the desired range tends to be facilitated.

The oscillation avoidance process tends to avoid intermittent icing from occurring as the oscillating temperature drops below 0° C.

The oscillation avoidance process tends to reduce or eliminate excessive wear on the valve 22 due to its constant operation.

FIG. 8 is a process flow chart showing certain steps of a process of improving the control laws 64 of the control module 20.

In this embodiment, the process of FIG. 8 is performed while the aircraft 2 is on the ground.

At step s60, a computer (such as a laptop computer or a tablet computer) that is separate from the aircraft 2 is connected to the control module 20. The computer is connected to the input connection 71 and the output connection 72.

In this embodiment, the input connection 71 and the output connection 72 are only accessible for connection with the computer while the aircraft 2 is grounded. While the aircraft 2 is in flight, the input connection 71 and the output connection 72 may be inaccessible for connection with a computer. For example, in some embodiments, while the aircraft 2 is in flight, the input connection 71 and the output connection 72 may be retracted into the housing 40, or may be covered by a cover.

At step s62, the processor 64 retrieves stored performance data from the memory 56. The performance data may include, but is not limited to, aircraft flight data, measurements taken by the thermistor 30, measurements taken by the internal temperature sensor 68, a log of the PWM valve control signals generated by the valve driver 52, a log of recalibrations of the control laws 78, a log of recalibrations of the amplifier 76, details of icing events, details of oscillation events, and a log of the relay control signals. The performance data may have been stored in the memory 56 while the aircraft 2 was in flight, e.g. during one or more aircraft sorties.

In some embodiments, step s62 is performed responsive to the computer being attached to the control module 20 as performed at step s60.

At step s64, the processor 64 sends the retrieved performance data to the computer. In this embodiment, the performance data is sent from the processor 64 to the external computer via the transceiver 60, the isolating relay 50, the controller 42, and the output connection 72.

At step s66, the received performance data is analysed to determine an update (for example, an improvement or refinement) for the control laws 78. For example, a new value or function for one or more of the threshold values may be determined. Also for example, new functions or criteria for implementation by the control laws 78 may be determined. In this embodiments, the update for the control laws 78 provides for improved operation of the environmental control system 4.

In some embodiments, the analysis of the performance data comprises an analytical/engineering design process, e.g. performed by a human operator using software tools.

In some embodiments, the computer performs the data analysis process on the received performance data. For example, the computer may perform a fault diagnosis process the diagnose aircraft faults. For example, the computer may, using the performance data, determine one or more faults with the processor 64 or another module of the environmental control system 4.

At step s68, the computer sends a configuration signal to the in-service programming module 58. The configuration signal specifies the update for the control laws determined by the computer. In this embodiment, the configuration signal is sent from the computer to the in-service signal processing module 58 via the input connection 71, the controller 42, and the isolating relay 50.

At step s71, the in-service programming module 58 updates the control laws 78 of the processor 64 using the received configuration signal.

Thus, a process of improving the control laws 78 is provided.

Advantageously the control laws 78 may be updated and improved based on past performance of the environmental control system 4. The control laws 78 may be updated after each aircraft sortie until optimal operation of the environmental control system 4 is achieved.

The control laws 78 may be advantageously updated to improve the control module's automatic recalibration of the amplifier 76 in response to internal temperature changes.

The control laws 78 may be advantageously updated to improve the control module's detection of, and/or response to, icing.

The control laws 78 may be advantageously updated to improve the control module's detection of, and/or response to, signal oscillation.

Advantageously, the isolating relay 50 tends to prevent or oppose the unwanted updating on the control laws while the aircraft 2 is in flight. Also, having the input connection 71 and/or the output connection 72 inaccessible while the aircraft 2 is in flight tends to prevent or oppose the unwanted updating on the control laws while the aircraft 2 is in flight.

It should be noted that certain of the process steps depicted in the flowcharts of FIGS. 4 to 8 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

Advantageously, the processes described above with reference to FIGS. 4 to 8 tend to be able to be performed simultaneously or at least overlapping to some extent temporally.

In the above embodiments, the control module is implemented in an environmental control system of a Hawk aircraft. The control system controls a mixture of bleed air and cooling air. However, in other embodiments the control module is implemented on a different entity, for example, a different type of aircraft. For example, in some embodiments the control module is to control a different type of system, i.e. other than an environmental control system.

In the above embodiments, an SPDT relay is used to provide switching between the thermistor signal and the reference resistor signal. However, in other embodiments a different switching means is used.

In the above embodiments, the cooling air is bleed air cooled using ambient air. However, in other embodiments, the cooling air is from a different source and/or is cooled in a different way, e.g. cooled ambient air.

In the above embodiments, the icing detection and avoidance process is performed in combination with one or more of the following processes: the cooling temperature control process, the automatic recalibration process, the oscillation detection and avoidance process, and the control law updating process. However, in other embodiments, the icing detection and avoidance process is performed, but not in combination with any of those other processes, i.e. the other processes may be omitted.

What is claimed is:

1. An aircraft environmental control system for controlling a temperature of a fluid, the control system comprising:
   a temperature sensor configured to measure a temperature of the fluid and to generate a first signal, the first signal being indicative of the measured temperature;
   a control signal generator configured to, dependent upon the first signal, generate a control signal for controlling the temperature of the fluid; and
   one or more processors configured to, responsive to determining that the measured temperature is less than or equal to a pre-determined threshold value, increase a gain of the control signal generator.

2. The aircraft environmental control system according to claim 1, wherein the pre-determined threshold value is less than or equal to 0° C.

3. The aircraft environmental control system according to claim 1, wherein:
   the fluid is a mixture comprising a second fluid and a third fluid;
   the environmental control system further comprises a valve for mixing the second fluid and the third fluid;
   the control signal generator is configured to, using the first signal, generate a control signal for controlling the valve; and
   the one or more processors are configured to, responsive to determining that the measured temperature is less than or equal to the pre-determined threshold value, increase a gain of the control signal generator, thereby increasing an amplitude and/or power of the control signal generated by the control signal generator.

4. The aircraft environmental control system according to claim 3, wherein:
   the second fluid comprises bleed air from a subsystem of the aircraft; and
   the third fluid comprises refrigerated bleed air.

5. The aircraft environmental control system according to claim 1, wherein the one or more processors are further configured to:
   determine that the measured temperature is oscillating about a central value; and
   responsive to the determining that the measured second temperature is oscillating about a central value, decrease the gain of the control signal generator.

6. The aircraft environmental control system according to claim 1, wherein the aircraft environmental control system further comprises:
   a control law module storing one or more control laws, the control laws being for use by the one or more processors when generating the control signal;
   a transmitter configured to transmit, from the aircraft environmental control system, for use by one or more entities remote from the aircraft environmental control system, performance data, the performance data including data selected from the group of data consisting of: one or more measured values of the temperature, data indicative of the first signal, data indicative of a gain of the control signal generator, and data indicative of the control signal; and a receiver configured to receive, responsive to the transmitter transmitting the performance data, from the one or more entities remote from the aircraft environmental control system, update information for use by the one or more processors;

the aircraft environmental control system being further configured, using the update information, to update the one or more control laws.

7. The aircraft environmental control system according to claim 1, wherein:

the control system further comprises an amplifier configured to amplify the first signal;

the control signal generator is configured to generate the control signal using the amplified first signal; and the one or more processors are further configured to, responsive to determining that a temperature of an operational environment of the amplifier is not within a predetermined temperature range, modify a gain of the amplifier.

8. The aircraft environmental control system according to claim 7, wherein:

the aircraft environmental control system further comprises a housing and a second temperature sensor configured to measure the temperature of the operational environment of the amplifier within the housing; and the amplifier, the second temperature sensor, and the one or more processors are located within the housing.

9. The aircraft environmental control system according to claim 7, wherein:

the aircraft environmental control system further comprises a baseline signal generation module configured to generate a baseline signal, the baseline signal being independent of the temperature of the operational environment of the amplifier;

the amplifier is further configured to amplify the baseline signal; and the one or more processors are further configured to, responsive to determining that the temperature of an operational environment of the amplifier is not within the predetermined temperature range, modify the gain of the amplifier using the amplified baseline signal.

10. The aircraft environmental control system according to claim 9, wherein:

the baseline signal generation module comprises a resistor having substantially constant resistance; and the baseline signal is indicative of a resistance of the resistor.

11. The aircraft environmental control system according to claim 9, wherein:

the environmental control system further comprises a relay switchable between a first mode and a second mode;

in its first mode, the relay connects the first temperature sensor to the amplifier and disconnects the baseline signal generation module from the amplifier;

in its second mode, the relay connects the baseline signal generation module to the amplifier and disconnects the first temperature sensor from the amplifier; and the one or more processors are further configured to, dependent on the measurements by the second temperature sensor, control the switching of the relay.

12. The aircraft environmental control system according to claim 11, wherein the one or more processors are further configured to, responsive to determining that the temperature of an operational environment of the amplifier is not within the predetermined temperature range, control the relay to switch from its first mode to its second mode.

13. An aircraft comprising an aircraft environmental control system according to claim 1.

14. An aircraft environmental control method for controlling a temperature of a fluid, the method comprising:

measuring, by a temperature sensor, a temperature of the fluid;

generating, by a control signal generator, a first signal, the first signal being indicative of the measured temperature;

generating, by a control signal generator, dependent upon the first signal, a control signal for controlling the temperature of the fluid;

determining, by a processor, that the measured temperature is less than or equal to a predetermined threshold value; and responsive to determining that the measured temperature is less than or equal to the pre-determined threshold value, increasing a gain of the control signal generator.

* * * * *